(12) United States Patent
Lesche et al.

(10) Patent No.: US 11,384,003 B2
(45) Date of Patent: Jul. 12, 2022

(54) LASER FILAMENTATION

(71) Applicant: Zwiesel Kristallglas AG, Zwiesel (DE)

(72) Inventors: Klaus Lesche, Kirchberg im Wald (DE); Gerhard Röck, Zwiesel (DE); Tobias Bredl, Zwiesel (DE)

(73) Assignee: Zwiesel Kristallglas AG, Zwiesel (DE)

( * ) Notice: Subject to any disclaimer, the term of this patent is extended or adjusted under 35 U.S.C. 154(b) by 1036 days.

(21) Appl. No.: 16/069,056

(22) PCT Filed: Dec. 28, 2016

(86) PCT No.: PCT/EP2016/002184
§ 371 (c)(1),
(2) Date: Aug. 21, 2018

(87) PCT Pub. No.: WO2017/121451
PCT Pub. Date: Jul. 20, 2017

(65) Prior Publication Data
US 2019/0016623 A1    Jan. 17, 2019

(30) Foreign Application Priority Data
Jan. 11, 2016   (DE) .................... 10 2016 000 184.4

(51) Int. Cl.
*C03B 33/095*   (2006.01)
*B23K 26/08*   (2014.01)
(Continued)

(52) U.S. Cl.
CPC ...... *C03B 33/0955* (2013.01); *B23K 26/0624* (2015.10); *B23K 26/0823* (2013.01);
(Continued)

(58) Field of Classification Search
CPC . C03B 33/0955; C03B 33/102; C03B 33/095; C03B 33/0222; B23K 26/53; B23K 26/0624; B23K 26/0823
See application file for complete search history.

(56) References Cited

U.S. PATENT DOCUMENTS

| 6,784,399 B2 * | 8/2004 | Dunsky .................. B28D 1/221 219/121.68 |
| 10,173,916 B2 * | 1/2019 | Bankaitis ............... B23K 26/53 |

(Continued)

FOREIGN PATENT DOCUMENTS

| CN | 104339083 A | 2/2015 |
| CN | 104690428 A | 6/2015 |

(Continued)

OTHER PUBLICATIONS

International Search Report issued in International Application No. PCT/EP2016/002184 dated May 2, 2017.

*Primary Examiner* — Dana Ross
*Assistant Examiner* — Kuangyue Chen
(74) *Attorney, Agent, or Firm* — Quinn IP Law (57) ABSTRACT

The invention relates to a method and a device for separating the excess glass (32) in the production of hollow glass products (12), wherein the method comprises: centring a hollow glass product (12) in a receiving device (10), which is designed to hold the hollow glass (12) and to rotate about a rotational axis in such a way that a separation line (24) along which the excess glass (32) is to be separated from the hollow glass product (12) to be produced is centred in relation to the rotational axis; processing the hollow glass product (12) in a plurality of positions along the separation line (24) by means of a laser beam in order to generate local filaments with a weakened glass structure during a rotation of the hollow glass product (12) about the rotational axis; and introducing energy along the separation line (24) in order to separate the excess glass (32) along the weakened glass structure.

12 Claims, 6 Drawing Sheets

(51) Int. Cl.
*B23K 26/53* (2014.01)
*C03B 33/02* (2006.01)
*B23K 26/0622* (2014.01)
*C03B 33/10* (2006.01)
*B23K 103/00* (2006.01)

(52) U.S. Cl.
CPC .......... *B23K 26/53* (2015.10); *C03B 33/0222* (2013.01); *C03B 33/095* (2013.01); *C03B 33/102* (2013.01); *B23K 2103/54* (2018.08)

(56) References Cited

U.S. PATENT DOCUMENTS

| | | | |
|---|---|---|---|
| 10,730,783 B2 * | 8/2020 | Akarapu | B23K 26/0006 |
| 2003/0102291 A1 * | 6/2003 | Liu | B41J 2/162 |
| | | | 219/121.73 |
| 2006/0000814 A1 * | 1/2006 | Gu | B23K 26/40 |
| | | | 219/121.69 |
| 2015/0136743 A1 * | 5/2015 | Hosseini | B23K 26/082 |
| | | | 219/121.61 |
| 2015/0140241 A1 * | 5/2015 | Hosseini | B23K 26/0622 |
| | | | 428/34.4 |

FOREIGN PATENT DOCUMENTS

| | | |
|---|---|---|
| CN | 104690430 A | 6/2015 |
| CN | 104813447 A | 7/2015 |
| DE | 4305107 A1 | 2/1995 |
| DE | 19729687 C1 | 7/1998 |
| DE | 102013212652 A1 | 12/2014 |
| JP | S61026530 A | 2/1986 |
| JP | S61036530 A | 2/1986 |
| JP | H01150491 A | 6/1989 |
| JP | 2001226134 A | 8/2001 |
| JP | 2004511423 A | 4/2004 |
| JP | 2007284269 A | 11/2007 |
| JP | 2011067858 A | 4/2011 |
| WO | 2012006736 A2 | 1/2012 |
| WO | 2016007843 A1 | 1/2016 |

* cited by examiner

LASER FILAMENTATION

The present invention relates to a method and a device for separating the excess glass (puffer cap) especially from drinking glasses or other hollow glass products.

In the manufacturing of drinking glasses or other hollow glass products, especially by a glass blowing technique, an important process step regularly involves the separating of the puffer cap (excess glass) from the actual drinking glass in an area of the glass forming the drinking rim at the end. Several methods are known in the glass industry for this process step, which meet the special requirements in the manufacture and processing of hollow glass products. While there are also many process technologies for separating or cutting of glass in the making of flat glass products, these are known to not be applicable to hollow glass products, or not easily applicable, on account of the different geometry.

Several methods are known in the glass industry for the separation of the puffer cap (excess glass) in drinking glasses. These methods shall be briefly listed below. One known method is the melting off of the puffer cap by means of flame in the hot forming process. In this case, a drinking glass with cap is heated by a torch at the height of the mouth rim beyond the softening temperature and then the cap being removed is pulled off by a defined movement. But the cap may also be removed, depending on the position of the glass, by its own weight and gravity. In both versions, prior to the actual separation of the cap from the drinking glass a constriction is produced, i.e., the detachment of the excess glass at the drinking rim generally begins in one position and propagates from there in both directions along the rim. The drawback to this method is the low quality of the mouth rim, since this has a bulging configuration and a thickening/eminence is usually produced at the mouth rim after the "pulling off" of the cap.

Another method is knocking off of the cap by a scoring wheel and flame. In this case, a lesion (designated breaking site) is produced in the glass at the later parting surface by scoring, for example with a diamond wheel or hard metal wheel. By pointlike flame action, the cap can then be knocked off from the drinking glass. Although a high quality of the mouth rim can be achieved with this method, the fracture edge must be wet ground, washed and then dried again prior to the actual fusing process. The fusing or fire polishing of the mouth rim is done afterwards in a separate smelting layout.

The separating of the puffer cap from the drinking glass may also be done by means of $CO_2$ laser. In this case, a parting site (lesion of the surface) is created by means of a laser beam in the area of the later mouth rim on the drinking glass. By scoring with a diamond or hard metal wheel a high quality can be produced, yet because of the method the mouth rim needs to be finish-polished and washed. A separate smelting layout is likewise required to create the mouth rim.

Yet $CO_2$ lasers are also used in the hot shaping process for the cutting off or melting off of the puffer cap. In this case, the drinking glass is heated to the softening temperature at the later parting site and then the cap is pulled off by a lifting movement. While the application in the hot range provides a good quality of the mouth rim, it makes the process control more difficult in terms of thermal stresses and the resulting glass breakage.

Given this background, the problem which the present invention proposes to solve is to create a simplified separation of the puffer cap or the excess glass of drinking glasses. This problem is solved by a method with the features indicated in claim 1. Preferred embodiments are the subject matter of the dependent claims.

In particular, the invention thus provides a method for separating the excess glass in the production of hollow glass products. This method comprises a centering of a hollow glass product in a receiving device, which is designed to hold the hollow glass product and to rotate about a rotational axis in such a way that a separation line along which the excess glass is to be separated from the hollow glass product to be produced is centered in relation to the rotational axis. In particular, the separation line lies in a plane perpendicular to the rotational axis. Furthermore, the method involves a processing of the hollow glass product in a plurality of positions along the separation line by means of a laser beam in order to generate local filaments with a weakened (or altered/damaged) glass structure during a rotation of the hollow glass product about the rotational axis. Such filaments in particular constitute channels extending longitudinally along the incident laser beam direction in which a material alteration occurs by virtue of a high laser intensity.

In order to attain the high laser intensity, preferably a focused laser is used, especially preferably a pulsed laser. Especially preferably, the laser is beamed in such that these longitudinal channels with altered or damaged or weakened structure of the glass material extend for a length which is longer, thanks to a self-focusing effect, than the actual Gaussian focus length of the laser beam. Such laser processes, especially the lasers preferably used for them, are described for example in WO 2012/006736 A2. However, these lasers were only proposed and used for flat glass there. Thanks to the manner of use according to the invention, especially in combination with the centering and rotating according to the invention of the glasses being processed, it has been recognized for the first time that the application in hollow glass products is possible and very efficient, despite the high demands on the precise focusing for the successful formation of the filaments.

After the formation of the filaments, the method further involves an introducing of energy along the separation line in order to separate the excess glass along the weakened glass structure.

The invention thereby achieves an especially efficient separation of the excess glass in which a contaminating further processing of the glass rim in the region of the separation line and thus also an immediately following cleaning is no longer needed. This reduces the necessary steps of the method and avoids, for example, cleaning fluid (e.g., water) being still present on the glass after the cleaning, which may be troublesome in subsequent process steps.

Although the novel process of laser filament cutting especially by means of ultrashort pulsed lasers has been in use to date in the flat glass industry, especially for hardened display glass (such as cell phones) (see, for example, the cited document WO 2012/006736 A2), it has so far not been published that this technology may also have great potential in the hollow glass industry as well, and in particular how this is possible. In the case of hollow glass products (stemware and glasses), this laser technology is particularly suitable for the separation of the excess glass (cap) on the drinking glass when it is employed in the manner proposed by the present invention.

Preferably, the centering of the hollow glass product involves a rough centering, involving in particular a placing of the hollow glass product on a support surface, a displacement of the hollow glass product on the support surface or in or on the receiving device to center the hollow glass product at the height of the separation line relative to the rotational axis, and a subsequent picking up of the hollow glass product by means of the receiving device. Alternatively, the displacement for purposes of the rough centering may also occur only after a picking up of the hollow glass product by means of the receiving device. In this case, the rough centering involves a displaceable picking up of the hollow glass product by means of the receiving device, a displacement of the hollow glass product in or on the receiving device or relative to the receiving device for the centering of the hollow glass product at the height of the separation line relative to the rotational axis, and a subsequent fixation or locking of the hollow glass product in or on the receiving device.

The rough centering is preferably done by direct mechanical contact and pressure on the glass in the region of the separation line by means of centering elements. Thus, no separate measuring is required in advance. The displacement can be done, for example, by means of a plurality of swiveling claws as the centering elements, which can move symmetrically to the rotational axis and can displace the hollow glass product in this way. Alternatively, prisms as centering elements which are movable relative to each other and also symmetrically to the rotational axis can also accomplish a displacement of the hollow glass product on the support surface before the hollow glass product is picked up by the receiving device. Especially preferably, the claws or prisms touch the hollow glass product in the region of the separation line, i.e., in particular in a region not more than around 20 mm, preferably in a region not more than around 10 mm, even more preferably in a region not more than around 5 mm away from the separation line.

In this way, a quick centering on the relevant region of the separation line can be accomplished in very simple and reliable manner, in order to keep the change in position of the laser processing on the separation line as slight as possible during a rotation of the glass.

It is especially preferable, however, if the centering elements (such as claws and/or prisms for example) touch the glass in the vicinity of the separation line (e.g., in the region of the aforementioned distances from it), but not beyond the separation lines, i.e., not in the region of the later glass, but (instead) in the region of the excess glass, i.e., the puffer cap. This prevents any lesions to the subsequent glass from the centering elements.

In one preferred embodiment, the centering of the hollow glass product involves a fine centering of the hollow glass product held by a holding device of the receiving device. The fine centering in particular involves a determination of a decentering of the hollow glass product held by the receiving device by means of a centering measurement device. Especially preferably, the determination of the decentering occurs during a rotation of the glass by means of the receiving device about the rotational axis. Furthermore, the fine centering preferably involves a displacement of the holding device of the receiving device relative to the rotational axis in order to compensate for the determined decentering at least in part.

Unlike the rough centering, the fine centering thus allows for a decentering in the mounted or locked state of the glass. Especially when picking up the glass by the receiving device or when locking the glass in the receiving device there may occur a not previously compensable decentering, for example if during the rough centering the glass bottom by which the receiving device preferably picks up the glass or by means of which the glass lies against or is locked against the holding device is not parallel to the support surface. In this case, the glass when picked up might be further tilted, so that the separation line is no longer centered exactly with respect to the rotational axis. Preferably, during the fine centering, especially in contrast with the rough centering, the glass is no longer directly touched and pressed for purposes of the displacement. Instead, preferably the holding device of the receiving device is displaced by pushing. Since no damage is possible to the glass in this way, somewhat larger forces may be used during this pushing as compared to the rough centering, so that it is possible to hold the glass locked throughout the fine centering, in order to prevent an unwanted or uncontrolled slippage. In this way, a higher precision and reproducibility is achieved during the fine centering.

In an especially preferred embodiment, the method involves both the rough centering and the fine centering, because in this way the fine centering can be confined to a comparatively slight displacement of the holding device, enabling a simplified yet also more precise design of the receiving device.

In another preferred embodiment, the processing of the hollow glass product by means of the laser beam involves a tracking of a focus point of the laser beam such that the tracking involves: a determining of an ovality and/or residual eccentricity of the hollow glass product along the separation line; and a displacement of an optical unit in a direction perpendicular to the rotational axis during a rotation of the glass in order to guide the focus point of the laser beam on the determined ovality and/or residual eccentricity. Thus, even with an ideal centering of the glass, variations in the working point of the laser may occur in the region of the separation line during a rotation of the glass, which are caused by a deviation of the glass cross section from an ideal circular form (ovality) along the separation lines. In order to achieve nevertheless the most precise possible focusing of the laser in the region of (especially within) the glass wall, this ovality is preferably detected individually for each glass and the focus point is guided accordingly in a plane perpendicular to the rotational axis. This ensures that the separation line ultimately also lies in a plane parallel to the glass bottom.

Preferably, the laser beam for the processing impinges substantially perpendicularly on the glass surface. Especially in the event of a glass which narrows or widens in the region of the separation line, an incidence of the laser beam for the processing of the hollow glass product on the hollow glass product therefore occurs in a direction of incidence which is not perpendicular to the rotational axis. But also in this case there occurs a guiding of the laser focus according to the ovality and/or residual eccentricity of the glass but preferably in a plane perpendicular to the rotational axis. But in the event of processing glasses with thicker walls, for which it is advantageous to bring about the filament formation not only during a rotation of the glass and at a focus depth relative to the glass surface, but also in several consecutive laser processing steps with different focus depths, the method preferably involves:

a first laser processing process, during which the glass is turned 360° about the rotational axis and the laser is set at a first focal depth in the glass wall of the hollow glass product; and a second laser processing process after the first laser processing process, during which the glass is turned 360° about the rotational axis and the laser is set at a second focal depth in the glass wall of the hollow glass product, which is displaced with respect to the first focal depth in a direction parallel to the beam incidence direction.

Thus, unlike the tracking to compensate for the ovality and/or residual eccentricity, the moving of the focal depths for consecutive laser processing processes to form the same separation line preferably does not occur necessarily in a plane perpendicular to the rotational axis, but preferably in a direction parallel to the beam incidence direction. It has been found that in this way a better interaction of the successively formed filaments result in an easier separation of the excess glass and a cleaner separation edge.

Preferably, the introducing of energy along the separation line in order to separate the excess glass along the weakened glass structure involves a local introducing of thermal energy during a rotation of the hollow glass product about the rotational axis. The thermal stresses produced in this way, preferably with no further mechanical action, already result in the targeted and precise glass breakage along the separation line.

In another aspect, the invention provides a corresponding device for the separation of the excess glass during the manufacturing of hollow glasses. This device comprises:
- a receiving device, which is designed to hold a hollow glass product and to rotate about a rotational axis,
- a centering device for centering the hollow glass product in the receiving device such that a separation line along which the excess glass is to be separated from the hollow glass product to be produced is centered in relation to the rotational axis;
- a laser processing device, which comprises in particular a focused, pulsed laser, for processing the hollow glass product in a plurality of positions along the separation line by means of a laser beam in order to generate local filaments with a weakened glass structure during a rotation of the hollow glass product about the rotational axis; and
- a separation device for introducing energy along the separation line in order to separate the excess glass along the weakened glass structure.

Preferably, the centering device comprises a rough centering device, which is designed to displace the hollow glass product on the support surface such that it is centered at the height of the separation line relative to the rotational axis. The receiving device is thereby preferably designed to pick up the hollow glass product centered by the rough centering device.

Preferably, the receiving device comprises a holding device able to move relative to the rotational axis for holding the hollow glass product. Preferably the centering device comprises:
- a centering measurement device for determining a decentering of the hollow glass product held by the receiving device; and
- a fine centering device for displacing the holding device of the receiving device relative to the rotational axis in order to compensate for the determined decentering at least in part.

Preferably the device comprises an ovality measurement device for determining an ovality and/or residual eccentricity of the hollow glass product along the separation line; and a tracking device which is designed to displace an optical unit of the laser processing device in a direction perpendicular to the rotational axis such that the focus point of the laser beam is guided on or follows the determined ovality and/or residual eccentricity during a rotation of the hollow glass product. In one embodiment, the ovality measurement device may be identical to the centering measurement device or be formed by it.

Preferably the laser processing device is designed to direct the laser beam in a beam incidence direction onto the hollow glass product that is not perpendicular to the rotational axis. The beam incidence direction is defined or formed by an optical axis of the optical unit of the laser processing device. This inclined beam incidence direction is especially advantageous when the separation line lies in a region of the glass with a widening or narrowing, i.e., a noncylindrical or inclined wall trend. In this way, the laser can still impinge locally perpendicularly on the glass wall, which reduces any optical losses (e.g., due to reflections). Especially preferably, the device is designed to adjust a first focal depth of the laser beam in the glass wall of the hollow glass product in a first laser processing process, during which the glass is rotated by 360° about the rotational axis, and to adjust a second focal depth of the laser beam in the glass wall of the hollow glass product in a second laser processing process, after the first laser processing process, during which the glass is rotated by 360° about the rotational axis, which is displaced in a direction parallel to the beam incidence direction with respect to the first focal depth. In this way, a greater glass thickness can be processed very precisely and reliably along the separation line. Preferably, in particular for even greater wall thickness of the glass, more than two revolutions (such as three, four or five) with successively modified focal depth are also possible.

Preferably, the separation device comprises a thermal energy source, especially a gas torch or a $CO_2$ laser, which is designed to inject thermal energy locally into the hollow glass product along the separation line during a rotation (one or more revolutions) of the hollow glass product about the rotational axis.

Preferably, the device comprises a plurality of processing stations, each of which comprises:
- a receiving device, which is designed to hold a hollow glass product and to rotate about a rotational axis; and
- a centering device for centering the hollow glass product in the receiving device such that the separation line along which the excess glass is to be separated from the hollow glass product to be produced is centered in relation to the rotational axis;
- an optical unit for focusing the laser beam on the hollow glass product held by the respective receiving device along the separation line; and
- a laser beam coupling element (e.g., a swiveling deflection mirror) for selective coupling of a laser beam into the optical unit of the respective processing station.

Preferably, each of the receiving devices in a plurality of processing stations is designed according to one of the preferred embodiments of devices as described here. The same holds for corresponding centering devices, each of which may comprise a corresponding rough centering device and/or a fine centering device. The tracking of the individual optical units to compensate for ovalities and/or residual eccentricity of the individual glasses may also be implemented specifically in the described preferred manners in each processing station.

Further details, especially for preferred embodiments and implementations of the invention, will be explained below as examples, making reference to the enclosed drawings. In the figures.

The starting point for a precise and reliable processing of the glass, especially by means of an ultrashort pulsed laser, is a very precise positioning of an optical unit of the laser relative to the glass being processed. This positioning, especially the spacing between the optics and the glass surface, needs to be maintained as precisely as possible during the entire processing process. Unlike a processing of flat glass, in which the spacing between optics and glass can be relatively easily determined and maintained, this requirement presents a challenge in the processing of drinking glasses on account of the different shapes and geometries of the drinking glasses, as well as the usually much larger tolerance or variation in the reproducibility of the exact shapes or geometries.

For a processing of drinking glasses by machine, it is advantageous to hold the glasses upside down, at least during a mechanical separating of the excess glass (puffer cap or cap), so that the cap which is going to be separated can drop down and thus no additional device is needed. Preferably for this, each glass prior to the processing for separation of the excess glass is picked up by means of a receiving device. Preferably for this, the drinking glass is at first placed upside down by its cap on a support surface (such as a support plate). After this, the glass can be picked up by means of the receiving device and lifted by a lifting movement (z direction). The receiving device here is preferably designed so that both stemware and drinking glasses can be picked up and held.

Figure 1A:
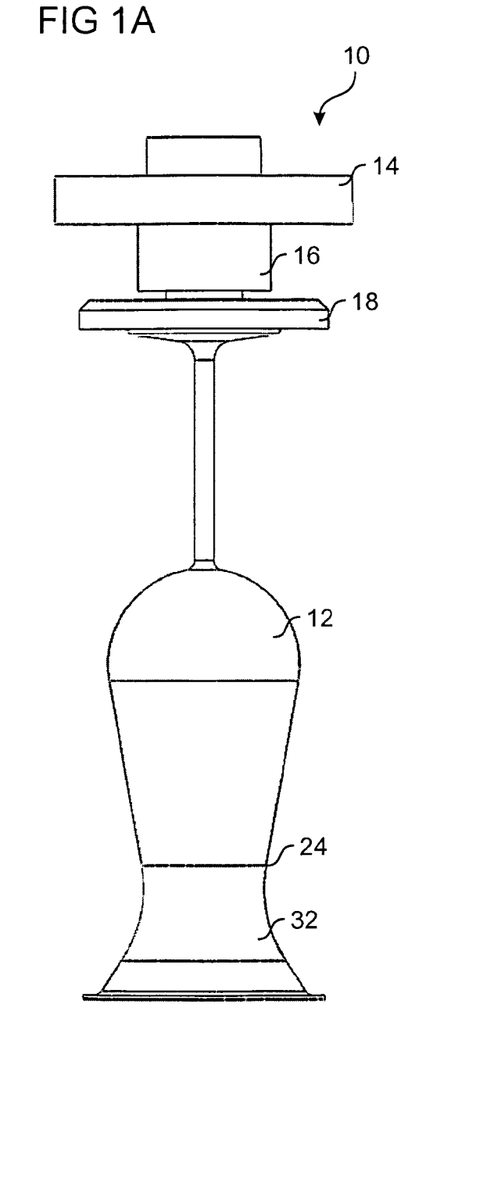
FIG. 1A shows a receiving device with a suction device for receiving a glass for a processing according to a preferred embodiment of the invention.
Figure 1B:
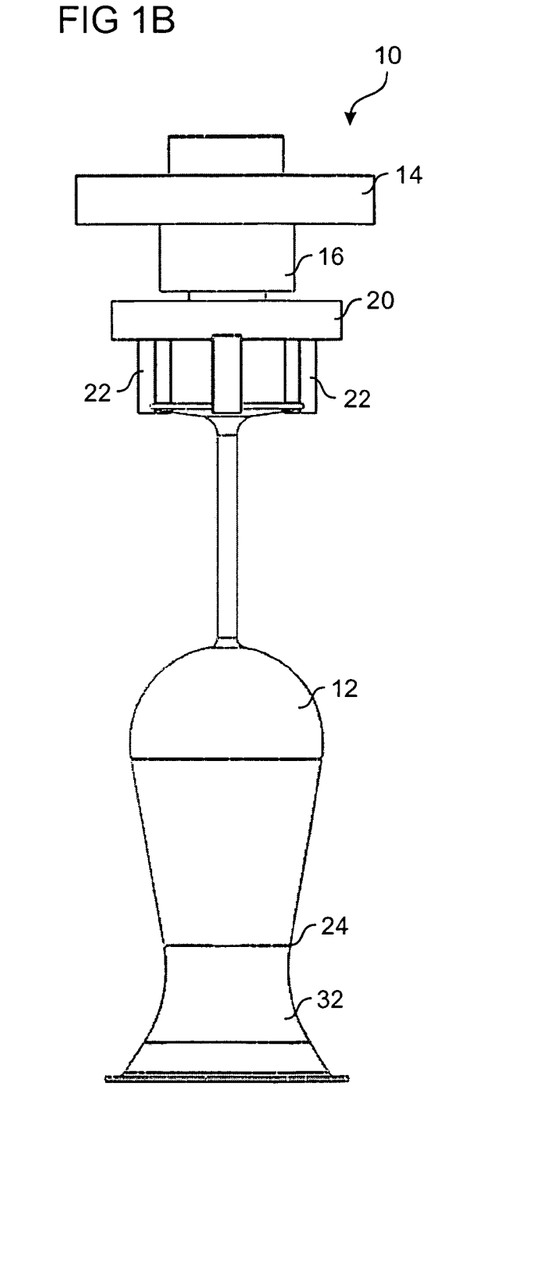
FIG. 1B shows a receiving device with a gripper device for receiving a glass for a processing according to another preferred embodiment of the invention.

FIG. 1A shows a receiving device 10 for picking up and holding a glass, especially a drinking glass 12 according to one preferred embodiment of the invention. Preferably, the receiving device comprises a rotation unit 14 which can turn in particular about a vertical rotational axis, on which a holding device is mounted for holding the glass 12. Especially preferably the holding device is connected by an adapter 16 to the rotation unit 14 and it can be replaced by a different holding device. In the preferred embodiment shown in FIG. 1A, the holding device is formed by a suction device 18, which is designed to hold the glass 12 by suction against the glass bottom. In another preferred embodiment per FIG. 1B, the holding device is formed by a gripper device 20, which is designed to hold the glass 12 by a plurality of gripper fingers 22 (preferably at least three). Regardless of the kind of holding device, it is preferably designed to hold the glass 12 such that the glass bottom is perpendicular to the rotational axis of the rotatable rotation unit 14.

Figure 2A:
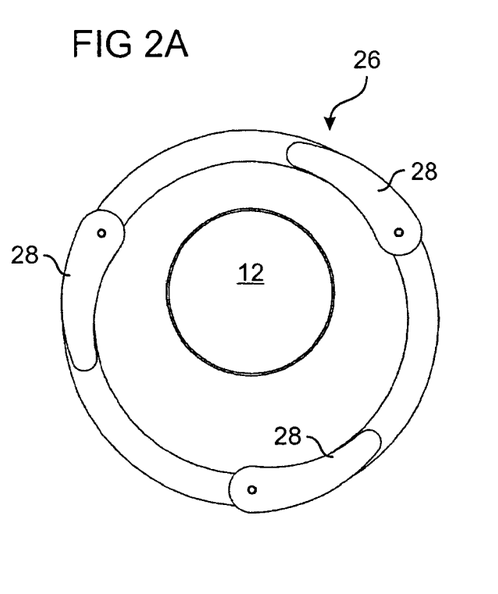
FIGS. 2A and 2B show the functioning of a rough centering device according to a preferred embodiment of the invention.
Figure 2B:
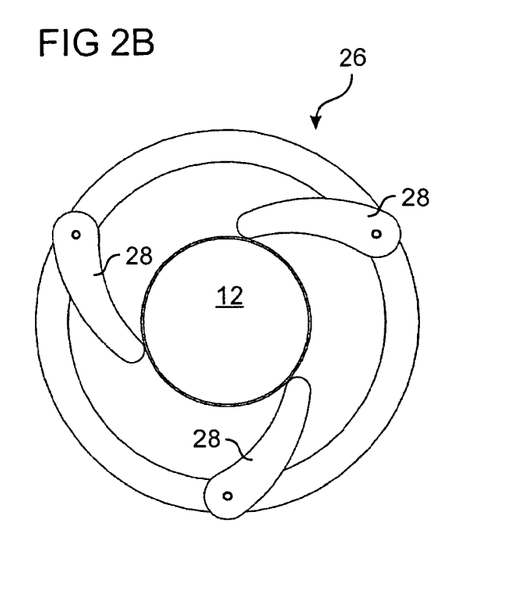
Figure 3A:
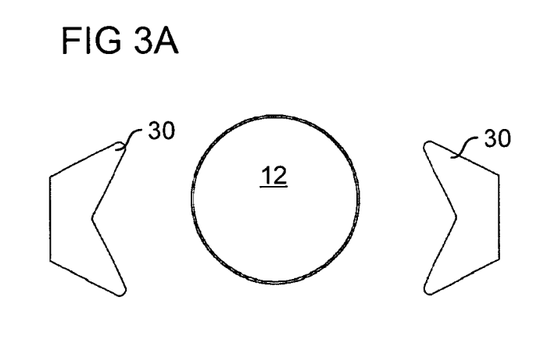
FIGS. 3A and 3B show the functioning of a rough centering device according to another preferred embodiment of the invention.
Figure 3B:
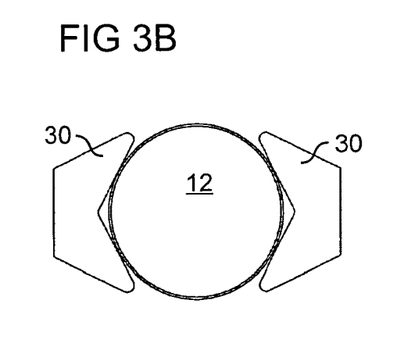

Preferably, the glass 12 is centered prior to being picked up via the receiving device 10, especially at the height of a later separation line or separation plane 24. That is, the glass 12 before being picked up by the receiving device 10 is positioned on the support surface such that it is centered in particular at the height of the later separation line with respect to a (vertical) rotational axis of the rotation unit 14. In this way, a good concentricity about the rotational axis can already be achieved. This preliminary centering is preferably accomplished by a rough centering device 26, as is shown for example in FIG. 2A. In this embodiment of FIG. 2A, the rough centering device 26 comprises a plurality of swiveling claws 28 as centering elements, which are preferably designed and arranged so as to touch the glass 12 roughly at the height of the later separation line and thereby displace it for the preliminary centering or rough centering on the support surface (FIG. 2B). In another preferred embodiment per FIG. 3A, the rough centering device 26 comprises a plurality of prisms 30 as the centering elements, which are preferably designed and arranged so as to touch the glass 12 roughly at the height of the later separation line and thereby displace it for the preliminary centering or rough centering (FIG. 3B). Other centering elements are also possible.

After the glass 12 has been preliminarily centered by means of the rough centering device 26, the glass 12 is picked up. During the pick-up step, the rough centering device 26 is situated preferably in the working position or holding position (especially per FIG. 2B or FIG. 3B), so that the drinking glass 12 cannot change its position. Once the process of picking up the drinking glass 12 is complete, the centering elements (e.g., claws 28 or prisms 30) are brought back to their starting position or basic position (especially that per FIG. 2A or FIG. 3A). The drinking glass 12 may now be lifted especially in the vertical direction (z direction) by the movable receiving device 10.

Figure 4A:
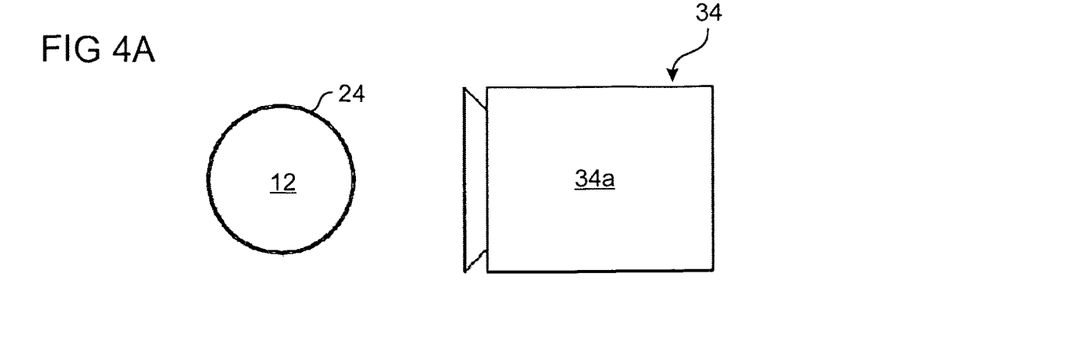
FIG. 4A to 4D show various centering measurement devices for detecting an out-of-round (decentering) according to preferred embodiments of the present invention.
Figure 4B:
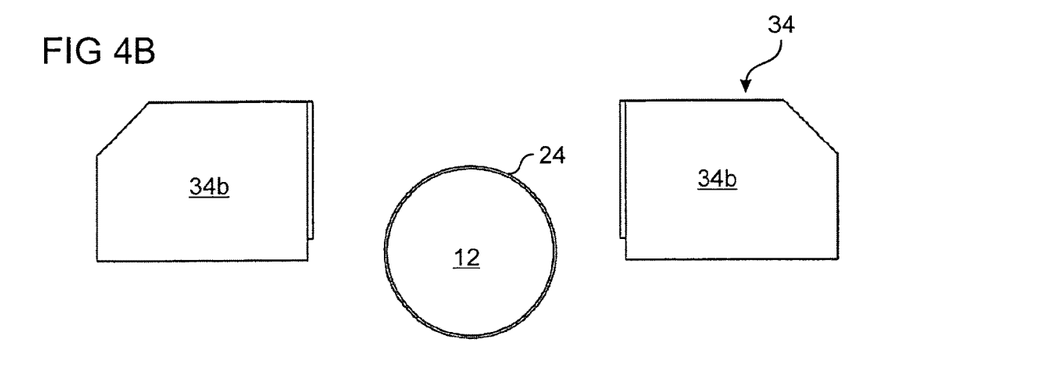
Figure 4C:
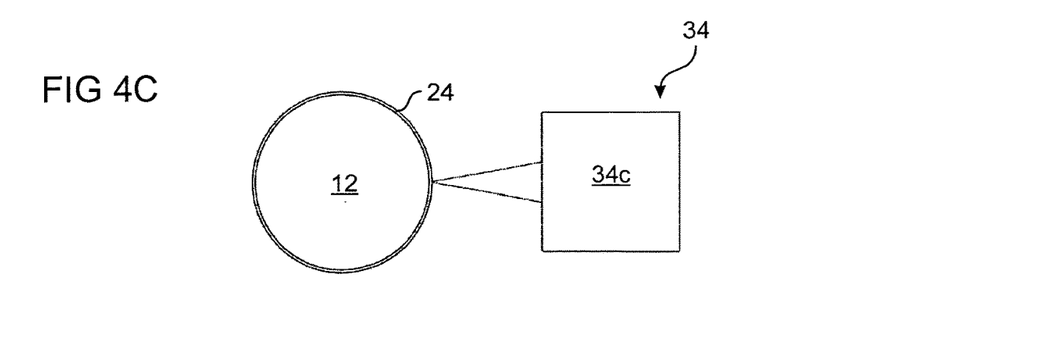
Figure 4D:
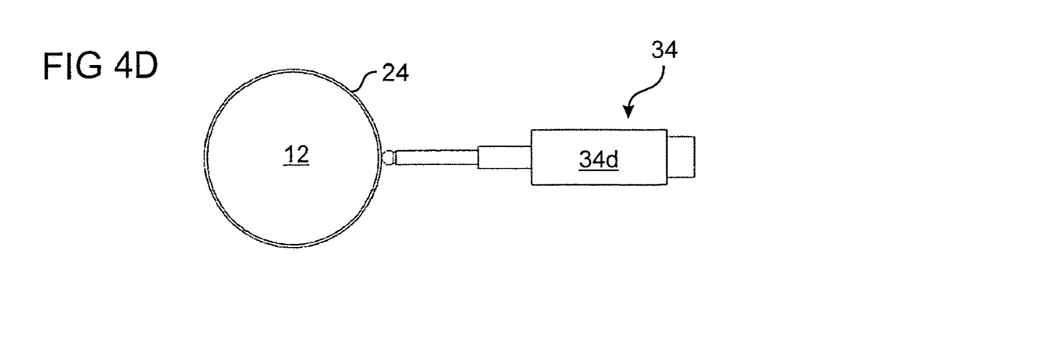

In order for the drinking glass 12 plus the cap or puffer cap 32 to be separated along the later separation line 24 to have the least possible concentricity deviation especially along the later separation line 24, the glass 12 is once more exactly measured and oriented, preferably after the pick-up. For this, a centering measurement device 34 is preferably used, which optically and/or mechanically detects concentricity deviations especially at the height of the later separation line 24 especially during a rotation of the glass 12 about the rotational axis of the rotation unit 14. FIG. 4A to 4D show preferred embodiments of the centering measurement device 34 in the form of a camera system 34a (FIG. 4A), a light band micrometer 34b (FIG. 4B), a white light sensor 34c (FIG. 4C) or a measuring probe 34d (FIG. 4D). The measurement occurs in particular substantially at the height of the later mouth rim, i.e., the separation line 24, especially along the entire periphery of 360°. The rotation of the glass 12 hanging upside down about the longitudinal axis is generated by a rotary drive integrated in the receiving device. The centering measurement device 34 used is preferably mounted in the layout such that the measurement can always be done in the right place even with different drinking glass geometries (different mouth rim diameter/height).

After the concentricity measurement is finished, the glass 12 is preferably automatically fine-centered or further-centered by means of a fine centering device 36. For example, in the preferred embodiment of a fine centering device 36 shown in FIG. 5A and FIG. 5B, the glass is automatically rotated to a defined position with maximum deflection. At this defined position, a stationary mounted pressing pin 38 then presses from the outside against the receiving device 10 (e.g., against the adapter 16 of the receiving device 10) so that the adapter 16, to which the suction device 18 or the gripper device 20 for example and thus also the glass 12 is optionally secured, is displaced in linear manner in the axial direction of the pressing pin 38. Thanks to the displacement by a defined amount (half of the maximum deflection), the concentricity deviation during the rotation of the glass 12 can be eliminated or at least reduced.

Figure 5A:
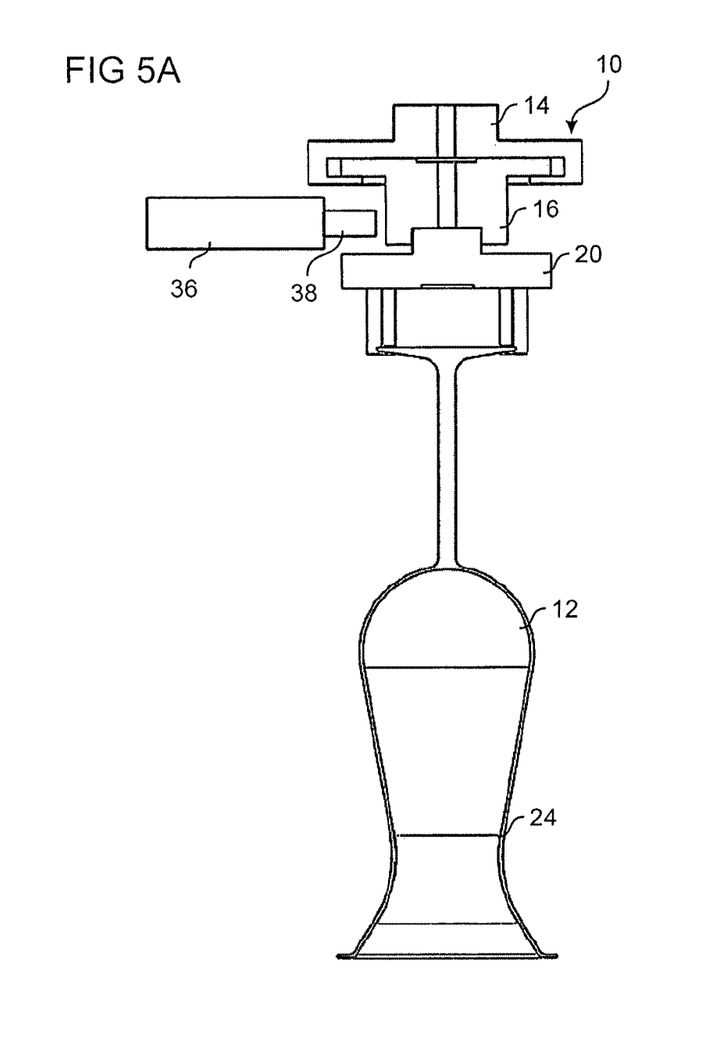
FIGS. 5A and 5B show the functioning of a fine centering device according to a preferred embodiment of the invention.
Figure 5B:
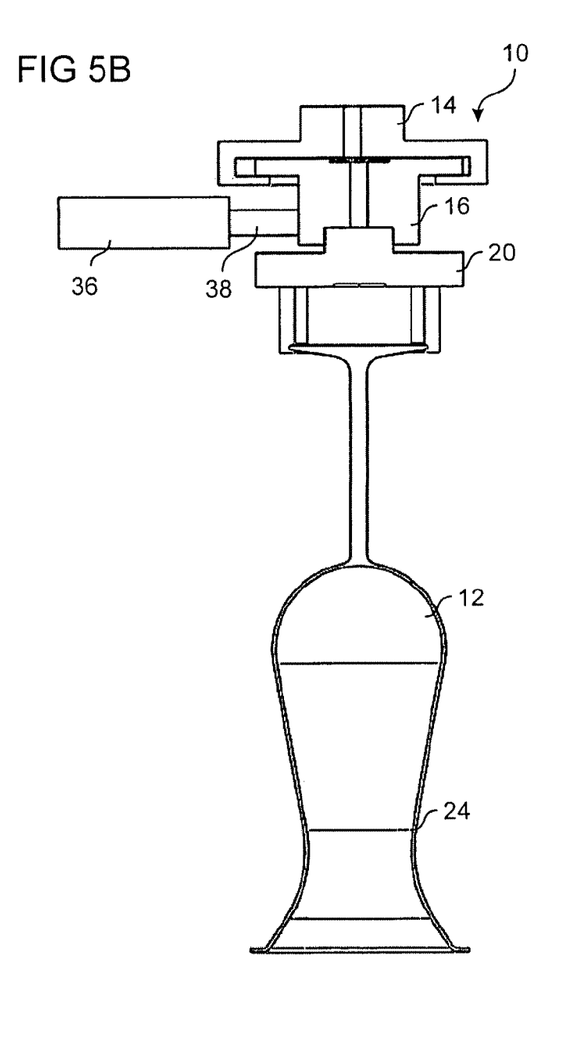

To facilitate a displacement of the adapter 16, it is preferably decoupled from the rest of the system (especially from the rotation unit 14) prior to the action of the pressing pin 38 so as to make possible a relative (especially a horizontal) displacement. After the external pressing pin 38 has displaced the glass 12 along with the holding device, the adapter 16 is preferably rendered rigid once more, so that the position of the glass no longer changes. If, now, the glass 12 after the measuring of the concentricity and subsequent orienting (fine centering or further centering) is once again rotated about the longitudinal axis or rotational axis, the runout (concentricity deviation) will be reduced to a minimum or totally eliminated in the area of the height of the mouth rim (separation line 24).

The actual laser processing (especially a perforation at the height of the mouth rim 24) preferably begins in particular after improving the concentricity properties by the rough centering and/or fine centering (or further centering). For this, the glass 12 is moved by the receiving device 10 to the next station, the laser chamber. This chamber should be enclosed and radiation-tight during the laser step, for safety reasons (e.g., laser protection class 4).

For an especially precise and reliable processing to separate the excess glass 32, especially when using a focused laser beam, the focus of the laser beam is regulated during the rotation of the glass so as to follow deviations of the glass 12 from an ideal circular shape (ovality) on the separation line 24 or an imperfect centering. For this, another measurement (ovality measurement) of the concentricity (e.g., the remaining decentering or residual eccentricity and/or the ovality) is preferably performed. The repeat measurement (ovality measurement) at the height of the future mouth rim 24 may be done once again with a measurement probe, a light band micrometer, an optical sensor (white light sensor) and/or a camera, for example. This may occur inside the laser chamber or also in advance of this. For example, the same centering measurement device 34 may be used for the ovality measurement as is used for the fine centering.

Figure 6A:
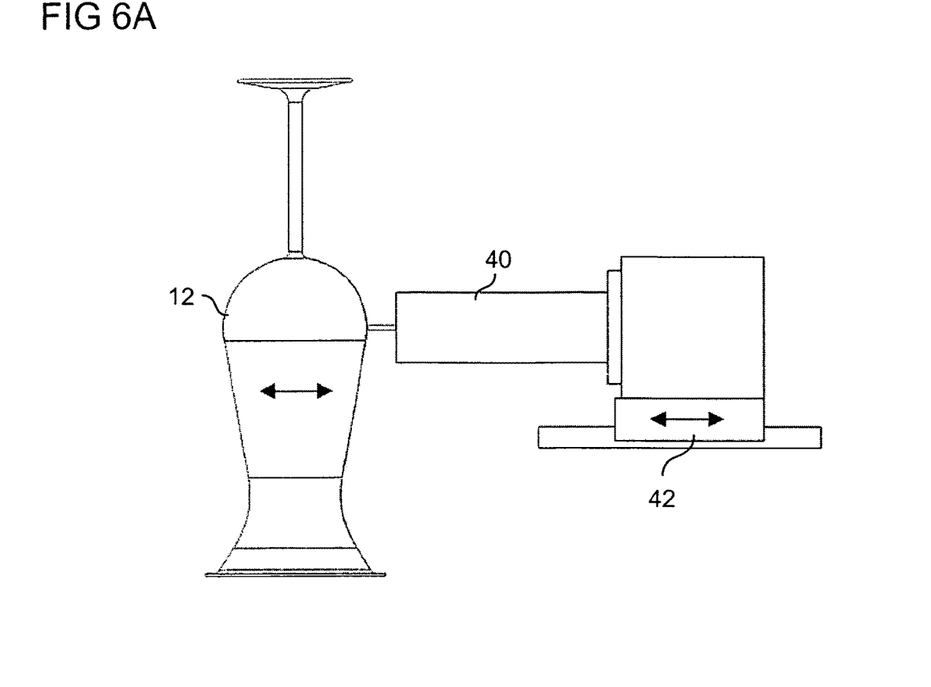
FIGS. 6A and 6B show the arrangement and functioning of a laser processing device according to different embodiments of the invention.

By means of this measurement or ovality measurement (cam disk), the optical unit of the laser being used can thus follow the glass surface (even when the ovality of the drinking glass 12 is large) over the entire periphery. A predetermined offset value defines the spacing between the optics and the glass. In order for the optical unit to move in linear manner, it must be secured to a traveling slide system. The slide system with the optics secured to it is preferably motor operated. FIG. 6A shows a sample optical unit 40 of a laser for the processing of the glass 12. By a slide system 42, the optical unit 40 can track an ovality of the glass 12 upon rotation. Preferably, the slide system 42 is designed to guide the optical unit 40 such that the focal point of the laser is changed in a plane perpendicular to the rotational axis of the rotation unit 14. This ensures in particular that the separation line 24 being produced is parallel to the glass bottom.

In order to obtain a good filament formation in the glass 12 and thus an excellent quality of cut along the separation line 24 during a laser processing step, the laser beam is preferably moved substantially perpendicularly to the glass surface. In the ideal case of a cylindrical glass or a glass section in the region of the separation line 24, the laser beam may travel horizontally, for example, in order to impinge on the glass surface such that the laser direction (beam) runs parallel to the direction of the tracking axis of the slide system 42.

Figure 6B:
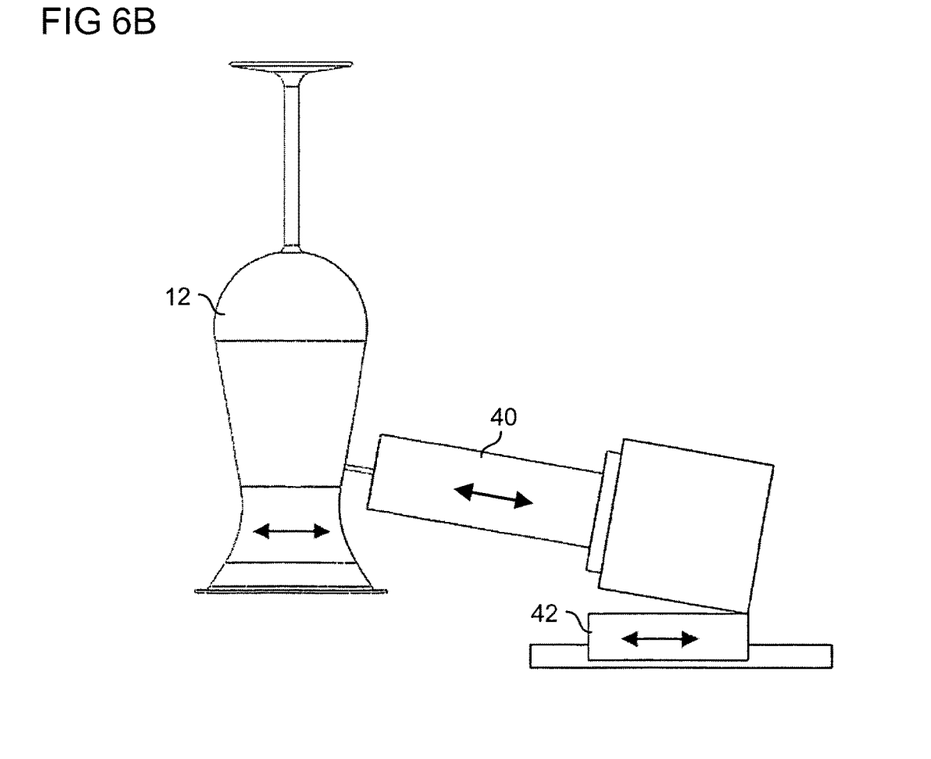

In the case of drinking glass geometries which undergo a significant widening or constriction toward the separation line 24 (e.g., the mouth rim), a beam direction deviating (inclined) from the plane of the separation line 24 is advantageous. In this case, the angle of attack of the optics (the angle between the tracking axis of the slide system 42 and the optical axis of the optical unit 40) preferably corresponds to the angle by which the glass narrows or widens (e.g., FIG. 6B). Alternatively to a tilting of the optical axis of the optical unit 40 or the laser beam direction with respect to the horizontal, a perpendicular incidence of the laser on the glass surface may also be achieved by a corresponding tilting of the glass or the rotational axis (of the rotation unit 14) with respect to the vertical. A combination of a tilting of the laser beam direction and the glass is also possible.

It is especially desirable to separate the excess glass with only a single laser processing step for the wall thickness in the entire periphery (i.e., a straight run of) 360°. If wall thicknesses greater than 2 mm are to be severed, several laser processing steps or straight runs of 360° with different focus setting relative to the thickness direction of the glass may be necessary or advantageous to achieving a good quality of cut. Preferably for this an adjustment of the focus is done after each laser processing step, i.e., after every full revolution of the glass (i.e., 360°). The tracking movement (focus adjustment) occurs preferably by a motor operated axial system on which the optical unit 40 is mounted.

In the case of a horizontal optics (i.e., the optical axis of the optical unit 40 lies in particular perpendicular to the rotational axis of the rotation unit 14, i.e., the tracking axis movement direction of the slide system 42 and the laser beam run parallel to each other), the focus can be very easily moved or adjusted. In this case, the value of the "working distance" (offset value) stored in the system is increased or decreased. Then, during the laser processing step, the tracking axis is actuated so that the ascertained cam disk is followed with the given offset value. Because the optical unit 40 runs parallel to the tracking axis, the laser processing also occurs always in the same plane. However, if a glass with one optical setting (angle of inclination between the optical unit and the tracking axis) requires several laser processing steps, an additional travel axis parallel to the optical setting, i.e., to the optical axis of the optical unit 40, will preferably be used, in order to track the working distance in consecutive laser steps according to the thickness of the glass.

In order to handle the highest possible piece lots with the technology according to the invention (cycle rates of up to 60 pieces or more), it is advantageous to provide processing stations with several receiving devices 10 in which several glasses can be held and rotated at the same time while a processing laser is processing the glasses. The laser processing of glasses being held at the same time can also occur in succession, which is especially advantageous if the available laser power can be better concentrated at a single processing step in this way. Since the actual laser processing occurs very quickly (e.g., within one rotation of a glass by 360° or 720°) as compared to the mechanical manipulation of the glasses from the pick-up to the measurement and centering, the individual processing steps may be very efficiently attuned to each other by a parallel holding, measuring and centering in combination with an at least partially serial laser processing.

Figure 7:
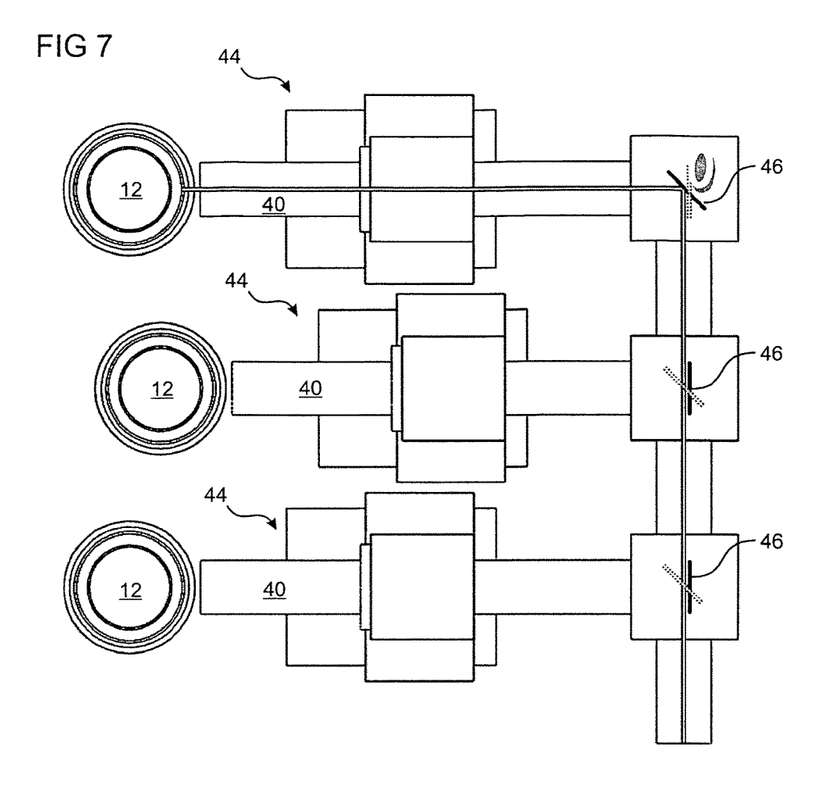
FIG. 7 shows a device according to a preferred embodiment of the invention with a plurality of processing stations.

FIG. 7 shows a processing station 44 according to one preferred embodiment with a plurality (especially three) of receiving devices and optical units 40, so that not every second needs to be cadenced (i.e., a glass replaced in a receiving device). The cycle rate can thus be reduced by a third, for example, by a combining of several individual stations (receiving devices and optical units) into groups (one processing station 44). The longest time between a cycle can then be utilized in the measurement of the concentricity and the subsequent orienting of the glasses or a subsequent fusing of the mouth rim. Since the compensation for runout can be done after the measurement of the concentricity for a group of three (parallel sequencing), the glasses can finally undergo laser treatment after a further cycle. The goal is to laser process several glasses in succession with only a single ultrashort pulse laser. In the case of a sequential processing of several drinking glasses, preferably each glass is given its own beam path including integrated optical unit 40 for the beam formation. The beam emerging from the laser source can be deflected by beam switches (e.g., swiveling deflection mirrors 46) so that the three glasses 12 arranged in a row can be laser processed in succession. The beam switches (deflection mirrors 46) are extended or retracted according to the processing location.

After filaments (perforations) have been introduced in particular along the entire periphery of the glass 12, the cap 32 can be separated from the drinking glass 12 in a next processing station. In order to reliably loosen the cap 32 from the glass, energy is preferably injected specifically in the form of heat at the separation surface or separation line 24 (filament line). This heat for example may be generated by means of a torch flame and/or by means of a laser beam of a $CO_2$ laser. In order for the heat to be distributed as evenly as possible over the entire circumference of the separation line 24, a rotation of the glass at constant rate of turning is preferable. Due to the stress difference produced by the heat (heat introduced at the separation site—"cold" glass (room temperature)), the cap 32 is separated from the rest of the drinking glass 12. Since the drinking glass 12 is preferably hanging upside down at the receiving device 10, the cap 32 can also drop down into a shaft and be transported away. Thus, no additional removal unit for the cap 32 is needed.

Figure 8A:
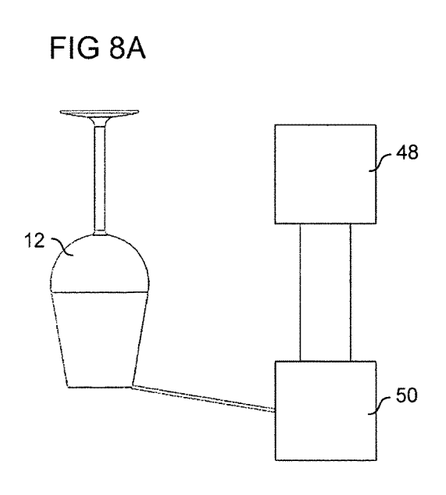
FIGS. 8A and 8B show a process of faceting the mouth rim of a drinking glass by means of a $CO_2$ laser.
Figure 8B:
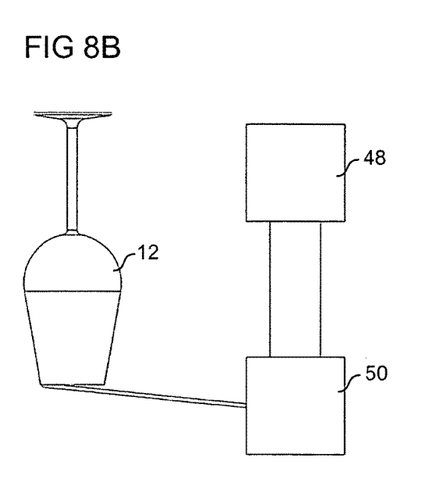

Since a very high quality of the cut edge at the separation line 24 can be created by filament cutting with an ultrashort pulsed laser, neither is any further processing in the form of polishing needed for the future mouth rim. The mouth rim may now be faceted directly with the $CO_2$ laser, if desired (creating a bevel at the outer and inner edge), as is shown for example in FIG. 8A and FIG. 8B. Here, the glass 12 is preferably set in rotation. A 2D scanner 50 connected to a $CO_2$ laser 48 deflects the laser beam onto the outer edge (FIG. 8A) for one revolution (360°) for example and onto the inner edge (FIG. 8B) of the glass 12 for another revolution, so that the sharp edges are removed thanks to the action of heat on the mouth rim and consequently a slight bevel is formed.

If desired, the mouth rim of the drinking glass may also be fused at further stations after the removal of the cap. Preferably the glass is at first heated over its surface and then processed for example with a sharp torch flame. The rotating glass—depending on the desired degree of fusion—is exposed to the flame for only a correspondingly short time. The glass is partly melted at the separation edge due to the heat, so that a rounding is formed in this location.

While the above specification has discussed in particular the production of drinking glasses, the method according to the invention and a corresponding device according to the invention can also be used for other nonplanar glass products or hollow glasses which are made in particular in a glass blowing technique and for which an excess glass (puffer cap) needs to be separated from the rest of the glass at a separation line. Thus, for example, glass vases, glass dishes or glass carafes can be produced according to the invention, but as long as the glass thickness lies preferably in a range of up to around 4 mm, especially preferably up to around 3 mm, even more preferably up to around 2 mm. Although larger glass thicknesses are not fundamentally excluded, corresponding high demands are placed on the laser power and the precise focusing of the laser and preferably several laser passes will be used (several revolutions along the separation line).

The present invention provides the necessary foundations, especially thanks to especially preferred multistaged centering and guidance of the laser, for making the realm of thicker glasses also accessible to a laser filament cutting method. This is especially advantageous because with this technology a contaminating further processing of the glass rim in the region of the separation line and thus also an immediately following cleaning is no longer needed. This reduces the necessary steps of the method and avoids, for example, cleaning fluid (e.g., water) being still present on the glass after the cleaning, which may be troublesome in subsequent process steps.

LIST OF REFERENCE NUMBERS 10 receiving device
12 glass, drinking glass
14 rotation unit
16 adapter
18 suction device
20 gripper device
22 gripper finger
24 separation line
26 rough centering device
28 claws
30 prisms
32 cap, puffer cap
34 centering measurement device
38 fine centering device
38 pressure pin
40 optical unit
42 slide system
44 processing station
46 deflecting mirror
48 $CO_2$ laser
50 2D scanner

The invention claimed is:

1. A method for separating excess glass in production of a hollow glass product, comprising:
   centering the hollow glass product in a receiving device, which is designed to hold the hollow glass product and to rotate about a rotational axis in such a way that a separation line along which the excess glass is to be separated from the hollow glass product to be produced is centered in relation to the rotational axis;
   processing the hollow glass product in a plurality of positions along the separation line by means of a laser beam in order to generate local filaments with a weakened glass structure during a rotation of the hollow glass product about the rotational axis; and introducing energy along the separation line in order to separate the excess glass along the weakened glass structure;

wherein the centering of the hollow glass product involves a rough centering, the rough centering involving:

placing of the hollow glass product upside down with the excess glass placed on a support surface or displaceable picking up of the hollow glass product upside down by means of the receiving device;

displacing the hollow glass product on the support surface or relative to the receiving device by direct mechanical contact with centering elements touching the hollow glass product in the region of the excess glass to center the hollow glass product at the height of the separation line relative to the rotational axis; and then picking up of the hollow glass product by means of the receiving device or locking of the hollow glass product relative to the receiving device such that a glass bottom of the hollow glass product is perpendicular to the rotational axis; and wherein the centering of the hollow glass product further involves a fine centering of the hollow glass product held by a holding device of the receiving device, wherein the fine centering involves:

determination of a decentering of the hollow glass product held by the receiving device by means of a centering measurement device; and displacement of the holding device of the receiving device relative to the rotational axis in order to compensate for the determined decentering at least in part.

2. The method as claimed in claim 1, wherein the introducing energy along the separation line in order to separate the excess glass along the weakened glass structure involves a local introducing of thermal energy during the rotation of the hollow glass product about the rotational axis.

3. The method as claimed in claim 1, wherein the processing the hollow glass product by means of the laser beam involves a tracking of a focus point of the laser beam such that the tracking involves:

determining an ovality and/or residual eccentricity of the hollow glass product along the separation line; and displacement of an optical unit in a direction perpendicular to the rotational axis during the rotation of the glass in order to guide the focus point of the laser beam on the determined ovality and/or residual eccentricity.

4. The method as claimed in claim 1, wherein an incidence of the laser beam for the processing of the hollow glass product on the hollow glass product occurs in a direction of incidence which is not perpendicular to the rotational axis and wherein the processing of the hollow glass product involves:

a first laser processing process, during which the glass is turned 360° about the rotational axis and the laser is set at a first focal depth in the glass wall of the hollow glass product; and a second laser processing process after the first laser processing process, during which the glass is turned 360° about the rotational axis and the laser is set at a second focal depth in the glass wall of the hollow glass product, which is displaced with respect to the first focal depth in a direction parallel to the direction of incidence.

5. The method as claimed in claim 1, wherein the processing the hollow glass product in the plurality of positions along the separation line by means of the laser beam in order to generate local filaments with the weakened glass structure involves an irradiation with a focused pulsed laser beam.

6. A device for separating excess glass in production of a hollow glass product, comprising:

a receiving device, which is designed to hold the hollow glass product and to rotate about a rotational axis, a centering device for centering the hollow glass product in the receiving device such that a separation line along which the excess glass is to be separated from the hollow glass product to be produced is centered in relation to the rotational axis;

a laser processing device for processing the hollow glass product in a plurality of positions along the separation line by means of a laser beam in order to generate local filaments with a weakened glass structure during a rotation of the hollow glass product about the rotational axis; and a separation device for introducing energy along the separation line in order to separate the excess glass along the weakened glass structure wherein the centering device comprises a rough centering device, which is designed to displace the hollow glass product on a support surface or relative to the receiving device such that it is centered at the height of the separation line relative to the rotational axis; and wherein the receiving device is designed to pick up or to lock the hollow glass product centered by the rough centering device; and wherein the receiving device comprises a holding device able to move relative to the rotational axis for holding the hollow glass product, and wherein the centering device comprises:

a centering measurement device for determining a decentering of the hollow glass product held by the receiving device; and a fine centering device for displacing the holding device of the receiving device relative to the rotational axis in order to compensate for the determined decentering at least in part.

7. The device as claimed in claim 6, wherein the separation device comprises a thermal energy source, including a gas torch or a $CO_2$ laser, which is designed to inject thermal energy locally into the hollow glass product along the separation line during the rotation of the hollow glass product about the rotational axis.

8. The device as claimed in claim 6, comprising:

an ovality measurement device for determining an ovality and/or residual eccentricity of the hollow glass product along the separation line; and a tracking device which is designed to displace an optical unit of the laser processing device in a direction perpendicular to the rotational axis such that the focus point of the laser beam is guided on the determined ovality and/or residual eccentricity during a rotation of the hollow glass product.

9. The device as claimed in claim 6, wherein the laser processing device is designed to direct the laser beam in a beam incidence direction onto the hollow glass product that is not perpendicular to the rotational axis, and wherein the device is designed to adjust a first focal depth of the laser beam in the glass wall of the hollow glass product in a first laser processing process, during which the glass is rotated by 360° about the rotational axis, and to adjust a second focal depth of the laser beam in the glass wall of the hollow glass product in a second laser processing process, after the first laser processing process, during which the glass is rotated by 360° about the rotational axis, which is displaced in a direction parallel to the beam incidence direction with respect to the first focal depth.

10. The device as claimed in claim 6, wherein the laser processing device comprises a focused pulsed laser.

11. A method for separating excess glass in production of a hollow glass product, comprising:
   centering the hollow glass product in a receiving device, which is designed to hold the hollow glass product and to rotate about a rotational axis in such a way that a separation line along which the excess glass is to be separated from the hollow glass product to be produced is centered in relation to the rotational axis;
   processing the hollow glass product in a plurality of positions along the separation line by means of a laser beam in order to generate local filaments with a weakened glass structure during a rotation of the hollow glass product about the rotational axis with a glass bottom of the hollow glass product being perpendicular to the rotational axis; and
   introducing energy along the separation line in order to separate the excess glass along the weakened glass structure,
   wherein the processing the hollow glass product by means of the laser beam involves a tracking of a focus point of the laser beam such that the tracking involves:
      determining an ovality and/or residual eccentricity of the hollow glass product along the separation line; and
      displacement of an optical unit in a direction perpendicular to the rotational axis during the rotation of the glass in order to guide the focus point of the laser beam on the determined ovality and/or residual eccentricity
   wherein an incidence of the laser beam for the processing of the hollow glass product on the hollow glass product occurs in a direction of incidence which is not perpendicular to the rotational axis and wherein the processing of the hollow glass product involves:
      a first laser processing process, during which the glass is turned 360° about the rotational axis and the laser is set at a first focal depth in the glass wall of the hollow glass product; and
      a second laser processing process after the first laser processing process, during which the glass is turned 360° about the rotational axis and the laser is set at a second focal depth in the glass wall of the hollow glass product, which is displaced with respect to the first focal depth in a direction parallel to the direction of incidence.

12. A device for separating excess glass in production of a hollow glass product, comprising:
   a receiving device, which is designed to hold the hollow glass product and to rotate about a rotational axis,
   a centering device for centering the hollow glass product in the receiving device such that a separation line along which the excess glass is to be separated from the hollow glass product to be produced is centered in relation to the rotational axis;
   a laser processing device for processing the hollow glass product in a plurality of positions along the separation line by means of a laser beam in order to generate local filaments with a weakened glass structure during a rotation of the hollow glass product about the rotational axis;
   a separation device for introducing energy along the separation line in order to separate the excess glass along the weakened glass structure;
   an ovality measurement device for determining an ovality and/or residual eccentricity of the hollow glass product along the separation line; and
   a tracking device which is designed to displace an optical unit of the laser processing device in a direction perpendicular to the rotational axis such that the focus point of the laser beam is guided on the determined ovality and/or residual eccentricity during a rotation of the hollow glass product; and
   wherein the laser processing device is designed to direct the laser beam in a beam incidence direction onto the hollow glass product that is not perpendicular to the rotational axis, and wherein the device is designed to adjust a first focal depth of the laser beam in the glass wall of the hollow glass product in a first laser processing process, during which the glass is rotated by 360° about the rotational axis, and to adjust a second focal depth of the laser beam in the glass wall of the hollow glass product in a second laser processing process, after the first laser processing process, during which the glass is rotated by 360° about the rotational axis, which is displaced in a direction parallel to the beam incidence direction with respect to the first focal depth.

* * * * *